United States Patent
Kloepzig et al.

(10) Patent No.: US 7,204,012 B2
(45) Date of Patent: Apr. 17, 2007

(54) METHOD FOR FABRICATING A ROTOR ARRANGEMENT AND A ROTOR ARRANGEMENT FOR AN ELECTRIC MACHINE

(75) Inventors: Markus Kloepzig, Forchheim (DE); Vladimir Vladimirovich Popov, Villingen-Schwenningen (DE)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 11/092,970

(22) Filed: Mar. 30, 2005

(65) Prior Publication Data

US 2005/0231057 A1    Oct. 20, 2005

(30) Foreign Application Priority Data

Apr. 7, 2004    (DE)    ................ 10 2004 017 157

(51) Int. Cl.
H02K 1/27      (2006.01)
H02K 15/03     (2006.01)

(52) U.S. Cl. ............ 29/598; 29/596; 310/156.01; 310/156.38; 310/156.53

(58) Field of Classification Search ............ 29/596, 29/598, 606, 607, 732; 310/46, 156.01, 156.07, 310/156.11, 156.38, 156.49, 156.53, 156.56, 310/156.68
See application file for complete search history.

(56) References Cited

U.S. PATENT DOCUMENTS

| | | | | |
|---|---|---|---|---|
| 2,413,323 A * | 12/1946 | Hills | ................. | 222/107 |
| 3,411,027 A * | 11/1968 | Rosenberg | ................. | 310/181 |
| 4,568,862 A * | 2/1986 | Tassinario | ................. | 318/254 |
| 5,220,228 A * | 6/1993 | Sibata | ................. | 310/254 |
| 5,783,890 A * | 7/1998 | Mulgrave | ................. | 310/156.43 |
| 6,225,724 B1 * | 5/2001 | Toide et al. | ................. | 310/216 |
| 6,441,525 B1 * | 8/2002 | Koharagi et al. | ................. | 310/156.56 |
| 6,525,442 B2 * | 2/2003 | Koharagi et al. | ................. | 310/156.48 |
| 6,630,762 B2 * | 10/2003 | Naito et al. | ................. | 310/156.53 |
| 6,674,205 B2 * | 1/2004 | Biais et al. | ................. | 310/156.53 |
| 6,684,483 B2 * | 2/2004 | Rahman et al. | ................. | 29/596 |
| 6,703,746 B2 * | 3/2004 | Biais et al. | ................. | 310/156.53 |
| 6,707,209 B2 * | 3/2004 | Crapo et al. | ................. | 310/156.43 |
| 6,741,002 B2 * | 5/2004 | Nishiyama et al. | ................. | 310/156.53 |

(Continued)

FOREIGN PATENT DOCUMENTS

DE    199 15 664    10/2000

(Continued)

OTHER PUBLICATIONS

[X_01], Sandstrom et al., Hard Magnetic Materials, Dec. 11, 2002, pp. 1-25☐☐internet: http://www.met.kth.se/mattechnol/FUMA2002/HardMagnets.doc.*

(Continued)

*Primary Examiner*—Peter Vo
*Assistant Examiner*—Livius R. Cazan
(74) *Attorney, Agent, or Firm*—Lowe Hauptman & Berner LLP

(57) ABSTRACT

A method for fabricating a rotor arrangement for an electric machine in which a rotor body is provided and permanent magnets made from an isotropic magnetic material are embedded in the rotor body, the permanent magnets being magnetized by an external magnetizing device with a magnetization that corresponds at least approximately to a Halbach magnetic field distribution.

7 Claims, 4 Drawing Sheets

U.S. PATENT DOCUMENTS

| | | | |
|---|---|---|---|
| 6,927,519 B2 * | 8/2005 | Popov ................... | 310/156.56 |
| 6,967,424 B2 * | 11/2005 | Popov ....................... | 310/216 |
| 6,972,503 B2 * | 12/2005 | Hasumi ................. | 310/156.43 |
| 6,979,924 B2 * | 12/2005 | Nishiyama et al. .... | 310/156.53 |
| 6,987,342 B2 * | 1/2006 | Hans ..................... | 310/156.56 |
| 7,042,126 B2 * | 5/2006 | Sidey et al. ........... | 310/156.43 |
| 2005/0225192 A1 * | 10/2005 | Kloepzig et al. ...... | 310/156.43 |

FOREIGN PATENT DOCUMENTS

| | | | |
|---|---|---|---|
| EP | 1 263 116 | | 2/2002 |
| EP | 1420500 A1 | * | 5/2004 |
| EP | 1450462 A1 | * | 8/2004 |
| FR | 2785105 A1 | * | 4/2000 |
| JP | 61121405 A | * | 6/1986 |
| JP | 2002153024 A | * | 5/2002 |
| JP | 02004072820 A | * | 3/2004 |
| JP | 2004072820 A | * | 3/2004 |
| WO | WO 97/37362 | | 10/1997 |

OTHER PUBLICATIONS

Zhilichev et al., In Situ Magnetization of Isotropic Permanent Magnets, Sep. 2002, IEEE Transactions on Magnetics, vol. 38, No. 5.*

* cited by examiner

Figure 3:
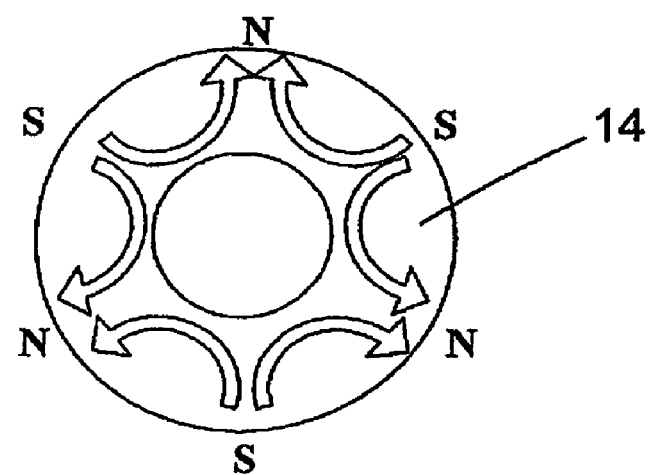

Fig. 3    (Prior Art)

METHOD FOR FABRICATING A ROTOR ARRANGEMENT AND A ROTOR ARRANGEMENT FOR AN ELECTRIC MACHINE

RELATED APPLICATIONS

The present application is based on, and claims priority from, German Application Number 10 2004 017 157.2, filed Apr. 7, 2004, the disclosure of which is hereby incorporated by reference herein in its entirety.

1. Field of the Invention

The invention relates to a method for fabricating a rotor arrangement for an electric machine and a corresponding rotor arrangement. The rotor arrangement according to the invention can be generally employed in such electric machines as DC motors and generators.

2. Background of the Invention

A large variety of electric motors is known on the market, all of which can be classified in various ways, such as according to their structure, their drive mechanism, their control mode, etc. A preferred field of application for the invention is in brushless DC motors and other permanent magnet motors, it being basically known to provide permanent magnets on the outer circumference of a rotor body or to embed them in the rotor body. The invention can further be employed in electric motors and generators that can be configured as inner rotor motors or as outer rotor motors. Electric motors having an inner rotor motor configuration have a rotor arrangement that is mounted onto a shaft and comprises one or more permanent magnets as well as a stator arrangement consisting, for example, of a number of stacked metal laminations which has an annular stator back yoke and pole shoes that protrude inwards from the stator back yoke. Phase windings are mounted on the pole shoes. The rotor arrangement is inserted coaxially into the stator arrangement. In the case of an outer rotor motor configuration, the rotor arrangement encloses the stator coaxially.

It is further known in the prior art to magnetize permanent magnets mounted on the outer circumference of the rotor in such a way that a magnetic flux line distribution conforming to a Halbach magnetization or an approximate Halbach magnetization is produced.

Figure 1:
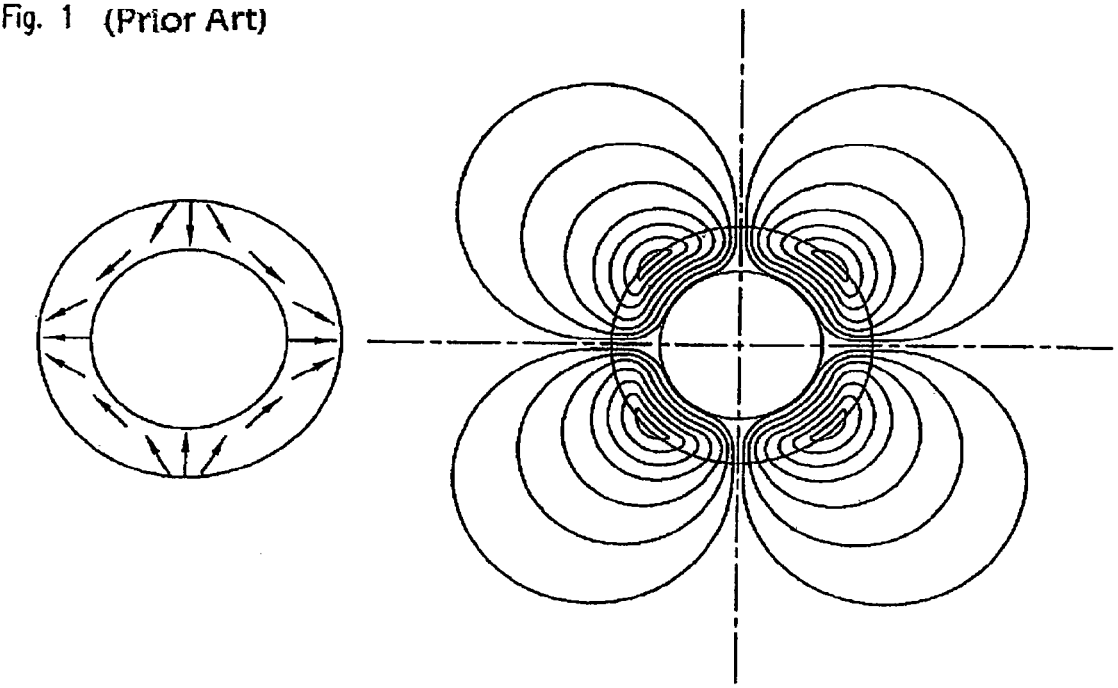
Figure 2:
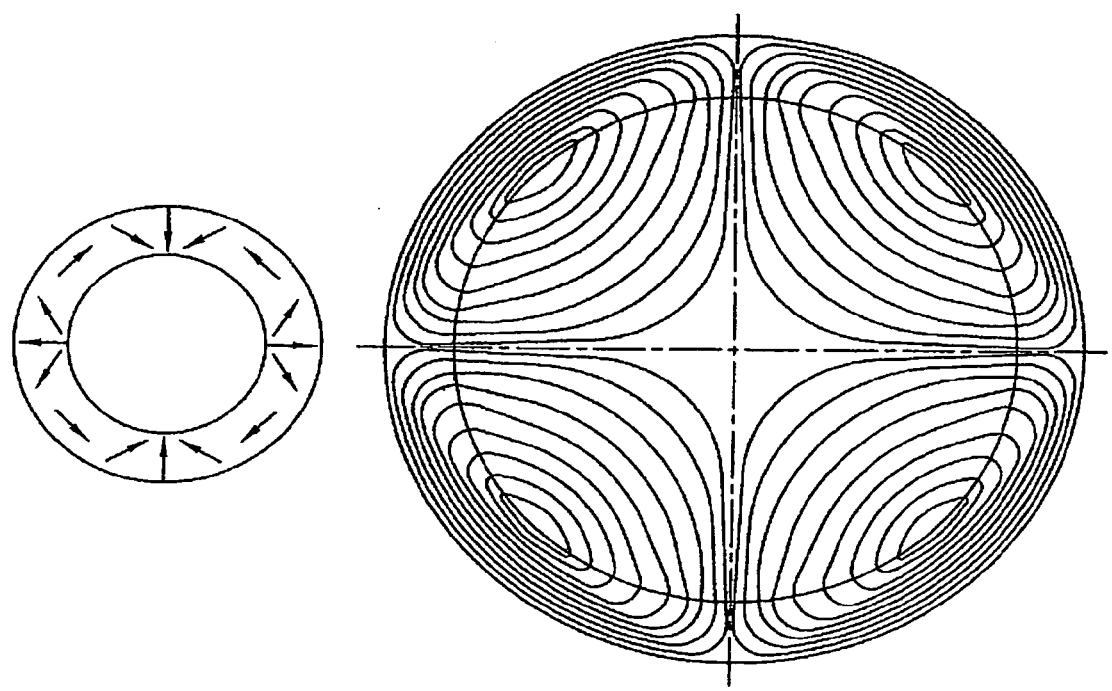

The basic principles of Halbach magnetization are described, for example, in "Halbach Cylinder Servo Motors" by Prof. D. Howe, University of Sheffield, Electrical Machines and Drives Group. Halbach magnetization makes it possible to concentrate the magnetic field generated by the magnets in sine curves. FIGS. 1 and 2 show the Halbach magnetization of a rotor ring for an inner rotor motor and for an outer rotor motor respectively, and the associated magnet flux line distribution. Due to the special flow of flux lines within the rotor, rotors having Halbach magnetization do not need a back iron yoke which can be used to reduce rotor mass and inertia. Furthermore, the sine-shaped or approximately sine-shaped magnetization goes to significantly reduce the cogging torque of the motor.

It is known to fabricate these kinds of magnetic rings or magnetic cylinders with Halbach magnetization for rotors from either pre-magnetized anisotropic magnetic segments having the required direction of magnetization or from isotropic magnetic rings which are magnetized with Halbach magnetization.

In known rotor arrangements, it is conventional for a segmented permanent magnet ring or several individual permanent magnets to be fixed side by side on a back yoke which is mounted onto the shaft. For motors with a low number of poles, such a multi-pole permanent magnet ring has its disadvantages since the magnet wall has to have a substantial thickness which means that a considerable quantity of magnetic material is needed.

WO 97/37362 shows a rotor body in which permanent magnets are embedded close to the periphery of the rotor body, the permanent magnets being magnetized to have a Halbach magnetic field distribution.

EP 1 263 116 reveals a rotor that has permanent magnets mounted on its outer circumference. The permanent magnets are arranged in the shape of a ring and divided into a large number of segments that are magnetized in such a way as to approximate Halbach magnetization.

Although rotor arrangements having Halbach magnetization have numerous advantages, here again the problem arises that, with a low number of poles, the permanent magnet ring on the outer circumference of the rotor is comparatively thick, thus making an excessive amount of magnetic material necessary.

It is the object of the invention to provide a rotor arrangement for an electric machine that can be manufactured at acceptable costs even if the rotor has a low number of poles.

SUMMARY OF THE INVENTION

According to the invention, a rotor arrangement is fabricated in that permanent magnets made from an isotropic magnetic material are embedded in a rotor body and the permanent magnets are then magnetized using an external magnetizing device, the magnetization at least approximating a Halbach magnetic field distribution. The permanent magnets are preferably disposed like spokes in the rotor body. The external magnetizing device preferably consists of a series of magnetizing coils that are disposed externally on the rotor body and positioned symmetric to the permanent magnets, the magnetizing coils generating magnetizing flux lines when activated which magnetize the embedded permanent magnets with Halbach magnetization, a special coil and/or permanent magnet design being unnecessary. The embedded permanent magnets made from an isotropic magnetic material are thus automatically given a magnetic alignment that corresponds at least approximately to a Halbach magnetic field distribution.

In a preferred embodiment of the invention, each pole of the rotor arrangement is formed from a plurality of individual magnets arranged like spokes, it being particularly advantageous if each pole is formed from two associated permanent magnets.

In another beneficial modification of the invention, the magnetizing coils generate magnetizing flux lines that run obliquely to the longitudinal direction of the rotor body in order to produce a skew in the magnetization of the permanent magnets, which results in a further reduction of cogging torque.

The invention also provides a rotor arrangement for an electric machine that has a rotor body and permanent magnets made from an isotropic material embedded in the rotor body. The permanent magnets are magnetized with a magnetization that corresponds at least approximately to a Halbach field distribution. The permanent magnets are preferably arranged spoke-like in the rotor body. It is particularly beneficial if each pole of the rotor arrangement is formed from several individual magnets.

The arrangement according to the invention results in a considerable reduction in the amount of magnetic material required, particularly for rotors with low numbers of poles. Further, due to the spoke-like arrangement of the embedded permanent magnets made from isotropic material and their external magnetization, the permanent magnets can easily achieve Halbach magnetization, which has the advantages mentioned at the outset. The greater the number of permanent magnets or spokes per pole of the arrangement provided, the closer the magnetization can approximate an actual Halbach flux line distribution. By using isotropic magnetic material and external magnetizing coils, the required Halbach magnetization is automatically achieved without the need for theoretic model building and calculations for the design of the permanent magnets and the magnetizing device.

SHORT DESCRIPTION OF DRAWINGS

Figure 4:
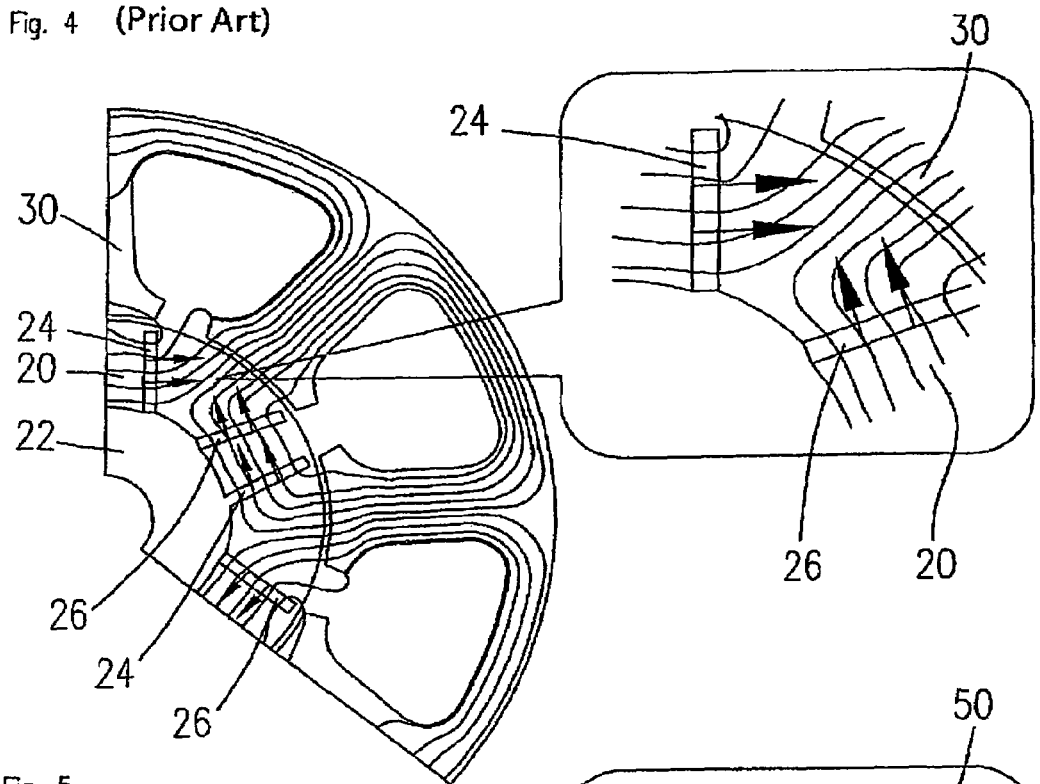
Figure 5:
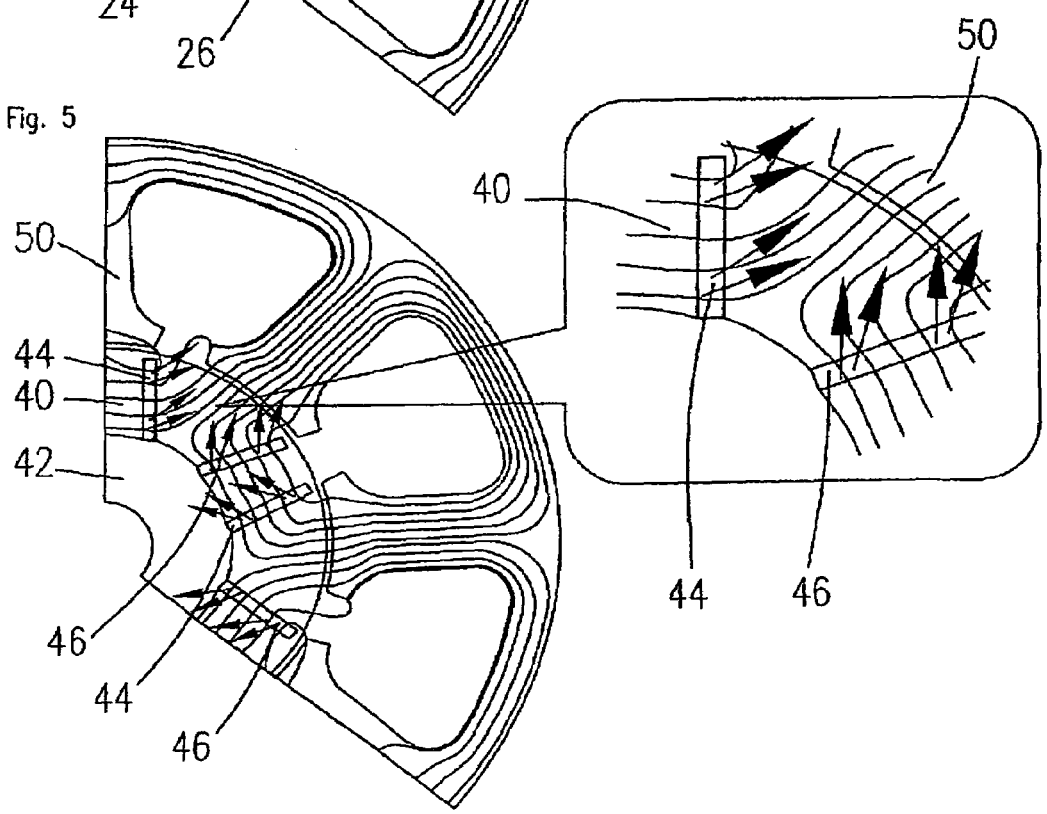
Figure 6:
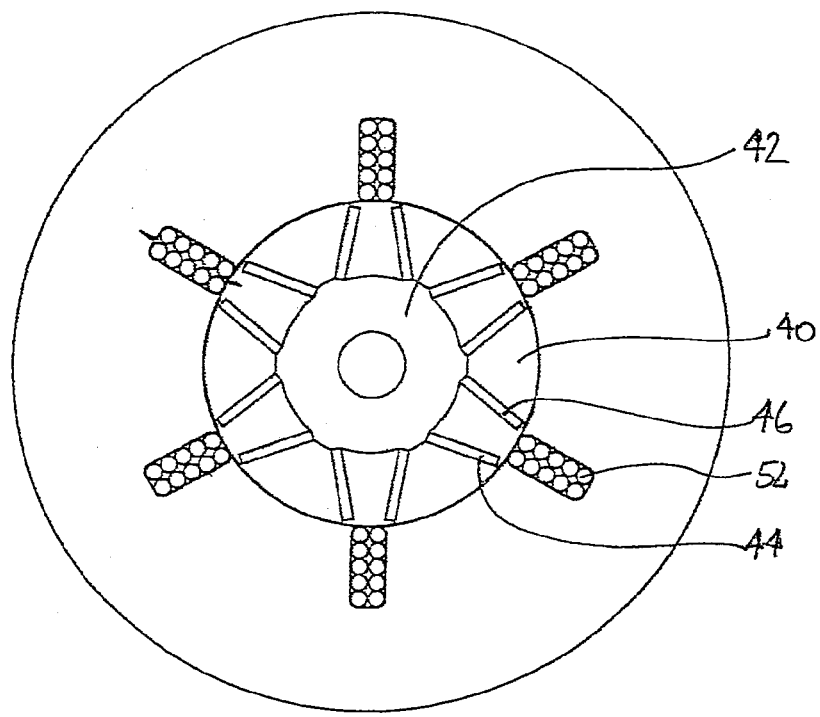
Figure 7:
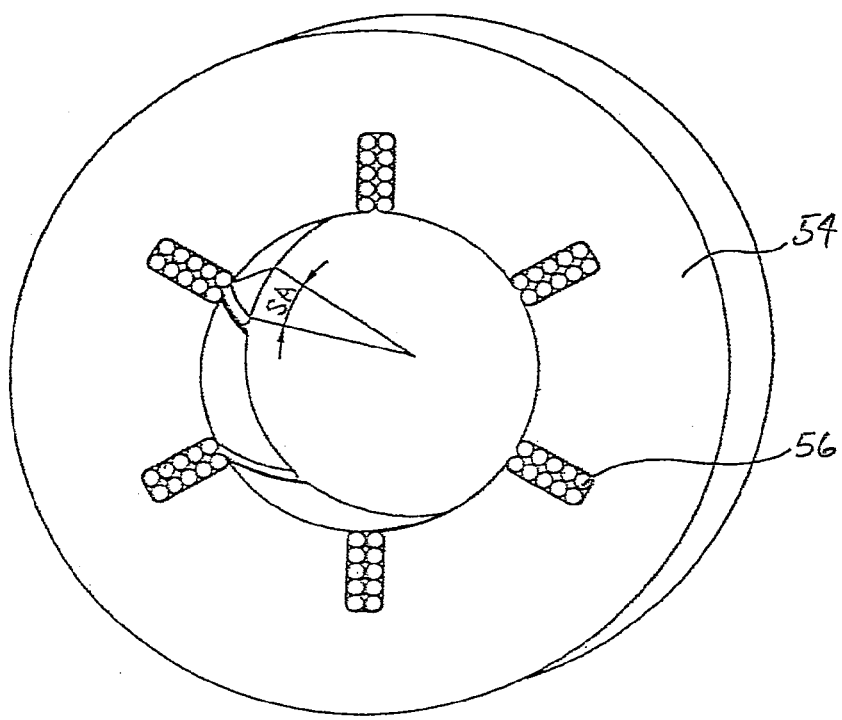

The invention is explained in more detail below on the basis of preferred embodiments with reference to the drawings. The figures show:

FIGS. 1 and 2 Halbach magnetization of a rotor ring and the associated flux line distribution for an inner rotor motor and for an outer rotor motor respectively;

FIG. 3 a schematic view of a magnetic ring for a rotor arrangement having multi-pole Halbach magnetization;

FIG. 4 a schematic partial view of an electric motor with a rotor arrangement having spoke-like permanent magnets according to the prior art;

FIG. 5 a schematic partial view of an electric motor with a rotor arrangement according to the invention;

FIG. 6 a schematic view from above of a rotor arrangement having an external magnetizing device according to the invention;

FIG. 7 a schematic view from above of an external magnetizing device to generate skewed magnetization of the rotor arrangement according to the invention.

DESCRIPTION OF PREFERRED EMBODIMENTS

FIGS. 1 and 2 show the magnetization and the corresponding flux line distribution for the permanent magnet ring of a rotor arrangement according to an inner rotor motor configuration (FIG. 1) and an outer rotor motor configuration (FIG. 2) respectively. In the case of a Halbach magnetization, the flux line distribution in the air gap between rotor and stator is inherently sine shaped, as a result of which theoretical minimum cogging torque is achieved and an essentially sine-shaped EMF waveform is produced. Since, due to the Halbach magnetic arrangement, the magnetic flux lines within the rotor are guided with hardly any leakage flux and thus practically shielded from one side, the permanent magnet ring can be mounted onto a rotor body that does not need an iron back yoke, as can be seen from the flux line distribution in FIGS. 1 and 2.

FIG. 3 schematically shows the multi-pole magnetization of a magnetic ring 14 of a rotor arrangement having Halbach magnetization. As can be seen from FIG. 3, a rotor arrangement of this type having a low number of poles needs a relatively thick magnetic ring in order to generate the desired Halbach flux line flow.

FIG. 4 shows a partial view of an electric motor with a rotor arrangement having embedded spoke-like permanent magnets according to the prior art. The rotor arrangement comprises a rotor body 20 that is mounted onto a carrier 22. The rotor body is mounted onto a shaft (not illustrated) via the carrier 22. The rotor body 20 forms a magnetic back yoke into which the permanent magnets 24, 26, which are disposed like spokes, are embedded. Each magnetic pole of the rotor arrangement is formed by a permanent magnet pair 24, 26. The rotor body 20 is inserted coaxially into a stator 30.

On the right-hand side of FIG. 4, there is an enlarged view of the rotor arrangement 20 in which the direction of magnetization of the permanent magnets 24, 26 is indicated by arrows. In the prior art, anisotropic magnets, in particular, are embedded in the rotor body 20 which are magnetized perpendicular to their longitudinal extension. This goes to produce the magnetic flux line distribution illustrated in FIG. 4.

FIG. 5 shows a partial view of an electric motor having a rotor arrangement according to the invention. The rotor arrangement comprises a rotor body 40 which, in the illustrated embodiment, is mounted onto a carrier 42. The rotor body 40 is either made up of several laminations or made of solid iron; given that the magnet geometry is appropriately adjusted, it could also be made of plastic. The carrier 42 is used to fix the rotor body 40 onto a shaft (not illustrated) and to position the rotor body and the permanent magnets 44, 46 embedded in the rotor body. The permanent magnets 44, 46 can be injection molded into the rotor body 40, in which case, for the sake of expedience, the carrier 42 can be set in the injection molding die during manufacture of the rotor arrangement in order to create an integral rotor arrangement. However, the rotor body 40 can also be designed in such a way that it secures the magnets 44, 46 to the carrier 42 in pockets provided for this purpose. In another embodiment of the invention, the entire rotor can also be formed from a plastic part without an iron back yoke being provided. The shaft and the rotor body can also be connected to each other without the use of an intermediary carrier.

The rotor body 40 is coaxially inserted into a stator 50.

According to the invention, the permanent magnets 44, 46 are made from an isotropic magnetic material that is magnetized by an external magnetizing device after the permanent magnets have been embedded into the rotor body 40 in order to create Halbach magnetization as described in more detail below. In the enlarged view on the right-hand side of FIG. 5, the direction of magnetization of the permanent magnets 44, 46 is indicated by arrows. It can be seen that the permanent magnets 44, 46 are not magnetized perpendicular to their longitudinal extension, but rather obliquely. The resulting course of the magnetic flux lines is marked in FIG. 5.

FIG. 6 schematically shows a rotor arrangement and an external magnetizing device according to the invention. The rotor arrangement corresponds to the view shown in FIG. 5 and is not described again here in detail. In order to magnetize the permanent magnets 44, 46 made from isotropic magnetic material according to the invention, magnetizing coils 52 are disposed on the outer circumference of the rotor arrangement, each being symmetrically aligned to a magnetic pole of the rotor arrangement. The coils 52 are activated and generate flux lines which are automatically aligned along lines corresponding to a Halbach magnetic field distribution.

In this way, the permanent magnets 44, 46 are given appropriate Halbach magnetization.

In the illustrated embodiment, a coil 52 is associated with each magnetic pole, the coil 52 at the outer circumference of the rotor 40 being associated with the appropriate pole located opposite.

FIG. 7 shows a modification of the magnetizing device illustrated in FIG. 6. Again in the magnetizing device 54 of FIG. 7, a magnetizing coil 56 is provided for each magnetic pole of the rotor arrangement (not illustrated in FIG. 7).

However, the magnetizing device 54 is designed in such a way that the coils 56 extend obliquely in an axial direction in order to generate a skew in the magnetization of the permanent magnets 44, 46 along the axial length of the rotor arrangement. The cogging torque produced by the electric motor can be reduced in this way.

The rotor arrangement according to the invention having embedded spoke-like permanent magnets made from an isotropic material, which is magnetized with Halbach magnetization using an external magnetizing device, can be manufactured in a simple process requiring a minimum amount of magnetic material. Inducing Halbach magnetization also makes it possible to exclude an iron back yoke from the design of the rotor body. It is possible to make the rotor body from a plastic base material in which the magnets are embedded. This means that no, or only very low, thermal tension is created in the magnets so that there is no risk of breakage. A particularly simple embodiment is created if the rotor body is injection molded directly onto the shaft.

According to the invention, the Halbach magnetization of the permanent magnets can be realized without the need for theoretic model building or a mathematically calculated permanent magnet design. The arrangement according to the invention is suitable for both low numbers as well as high numbers of poles. Despite the use of individual magnets with a simple magnetic form, it is still possible to achieve Halbach magnetization.

The characteristics revealed in the above description, the claims and the figures can be important for the realization of the invention in its various embodiments both individually and in any combination whatsoever.

IDENTIFICATION REFERENCE LIST

20 Rotor body
22 Carrier
24, 26 Permanent magnets
30 Stator
40 Rotor body
42 Carrier
44, 46 Permanent magnets
50 Stator
52 Magnetizing coils
54 Magnetizing device
56 Magnetizing coils

The invention claimed is:

1. A method of fabricating a rotor arrangement for an electric machine, said method comprising:
   providing a rotor body;
   embedding permanent magnets made from an isotropic magnetic material in the rotor body, each of the permanent magnets having a longitudinal direction and inner and outer ends opposed in said longitudinal direction, the permanent magnets being arranged in a spoke-like manner in pairs of neighboring permanent magnets;
   providing an external magnetizing device comprising a plurality of magnetizing coils which extend obliquely relative to an axial direction of the external magnetizing device;
   arranging the external magnetizing device to be coaxial with the rotor body so that each of the magnetizing coils of said external magnetizing device is positioned opposite one of the pairs of neighboring permanent magnets of said rotor body, the neighboring permanent magnets in each said pair being inclined towards each other so that the outer ends of said neighboring permanent magnets facing the respective magnetizing coil are closer together than the inner ends thereof; and
   activating the external magnetizing coils to generate magnetizing flux lines in order to magnetize the permanent magnets with a magnetization that corresponds at least approximately to a Halbach magnetic field distribution, so that the magnetization of each of the permanent magnets is transverse to the longitudinal direction of said permanent magnet;
   wherein, when the external magnetizing device is arranged to be coaxial with the rotor body, the magnetizing coils also extend obliquely relative to the axial direction of said rotor body to generate, when activated, a skew in the magnetization of the permanent magnets along the axial direction of the rotor arrangement.

2. A method according to claim 1, further comprising:
   arranging said external magnetizing device so that said external magnetizing coils of said external magnetizing device are respectively positioned between magnetic poles each of which is defined by two adjacent pairs of permanent magnets embedded in the rotor body.

3. A method according to claim 2, wherein the magnetizing coils generate magnetizing flux lines which run obliquely to the axial direction of the rotor body.

4. A method according to claim 1, wherein each pole of the rotor arrangement is built up from several said permanent magnets.

5. A method according to claim 1, wherein said rotor body is free of magnetic materials.

6. A method according to claim 1, wherein said rotor body is made of plastics.

7. A method according to claim 6, wherein said rotor body is entirely injection molded from plastics to embed the permanent magnets therein.

* * * * *